United States Patent [19]
Matsugase

[11] Patent Number: 5,970,036
[45] Date of Patent: Oct. 19, 1999

[54] AUTOMATIC DISC PLAYBACK APPARATUS

[75] Inventor: Hiroshi Matsugase, Kita Gunma-gun, Japan

[73] Assignee: Victor Company of Japan, Ltd., Japan

[21] Appl. No.: 08/955,451

[22] Filed: Oct. 21, 1997

[30] Foreign Application Priority Data

Nov. 29, 1996 [JP] Japan ................................. 8-335140

[51] Int. Cl.$^6$ ............................. G11B 33/02; G11B 17/04
[52] U.S. Cl. ........................................ 369/75.2; 360/99.07
[58] Field of Search .................................. 360/92, 98.01, 360/98.04, 99.06, 137; 369/34, 36, 38, 75.2, 178, 183, 191, 192, 193, 291, 292

[56] References Cited

U.S. PATENT DOCUMENTS

| | | | |
|---|---|---|---|
| 4,464,743 | 8/1984 | Takizawa et al. | 369/75.2 |
| 4,800,554 | 1/1989 | Yamasaki et al. | 369/291 |
| 4,841,394 | 6/1989 | Tomizawa et al. | 360/99.06 |
| 4,949,324 | 8/1990 | Arata | 369/36 |
| 5,089,920 | 2/1992 | Bryer et al | 360/92 |
| 5,101,388 | 3/1992 | Fushimi | 369/36 |
| 5,157,564 | 10/1992 | Theobald et al. | 369/92 |
| 5,237,555 | 8/1993 | Tsuruta et al. | 369/77.2 |
| 5,384,760 | 1/1995 | Kumakura | 369/38 |
| 5,469,310 | 11/1995 | Slocum et al. | 360/92 |
| 5,517,748 | 5/1996 | Park | 29/741 |
| 5,621,708 | 4/1997 | Fujita et al. | 369/38 |
| 5,802,021 | 9/1998 | Mukaida | 369/34 |

FOREIGN PATENT DOCUMENTS

| | | |
|---|---|---|
| 0 614 180 A2 | 9/1994 | European Pat. Off. |
| 0 614 180 A3 | 9/1994 | European Pat. Off. |
| 0 628 963 A2 | 12/1994 | European Pat. Off. |
| 0 632 443 A2 | 1/1995 | European Pat. Off. |
| 0 684 604 A2 | 11/1995 | European Pat. Off. |

Primary Examiner—David L. Ometz
Assistant Examiner—Angel Castro
Attorney, Agent, or Firm—Parkhurst & Wendel, L.L.P.

[57] ABSTRACT

A sub tray selector is provided in a casing and rotatable so as to adjust a selecting position in accordance with the height of a designated sub tray. The sub tray selector is capable of retaining the designated sub tray and any other sub trays stacked thereon and disengaging each of the retained sub trays from a sub tray engaging member in accordance with a shifting motion of a base tray advancing to the external position. Thus, the retained sub trays stay at the standby position.

16 Claims, 8 Drawing Sheets

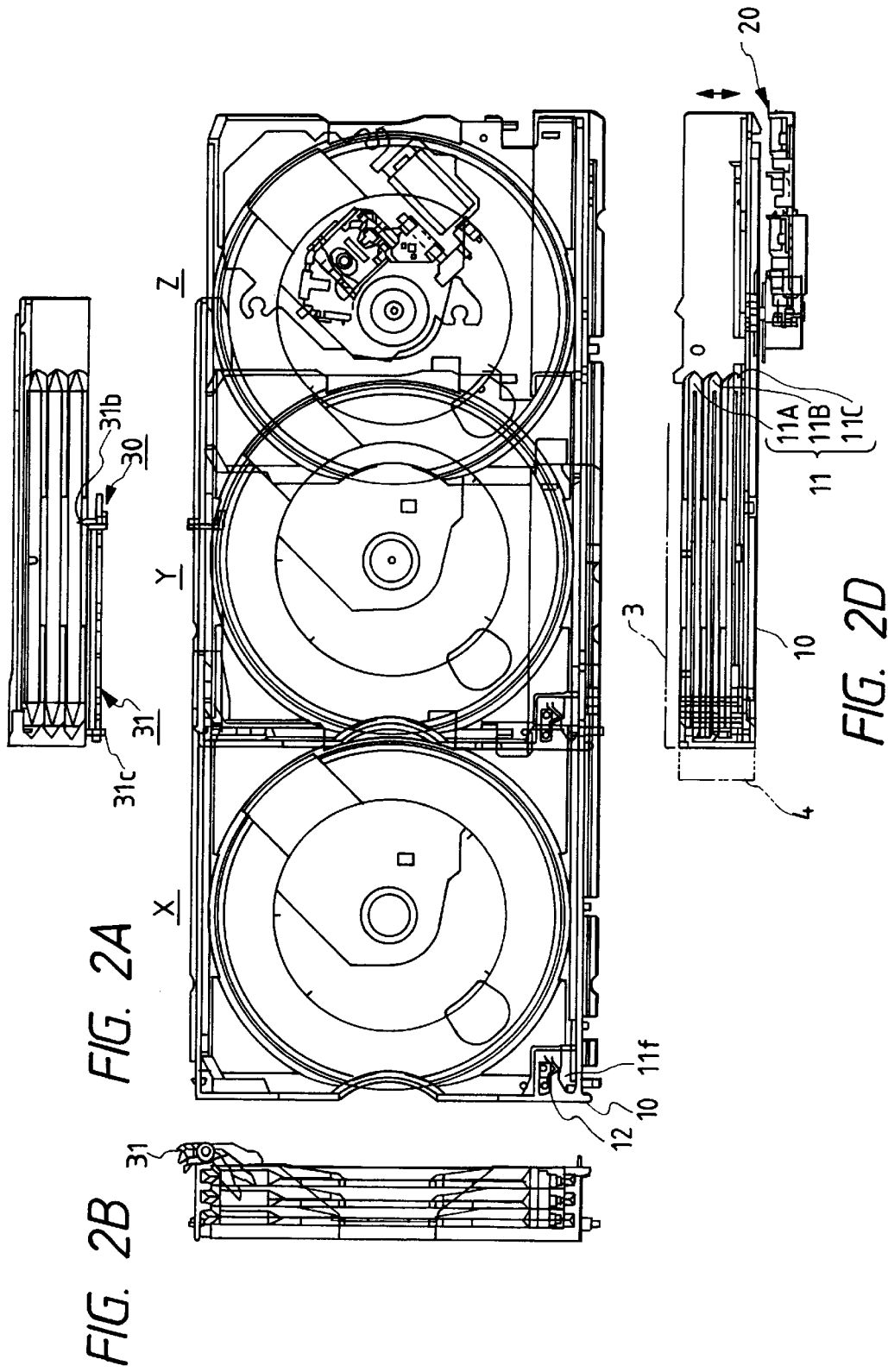

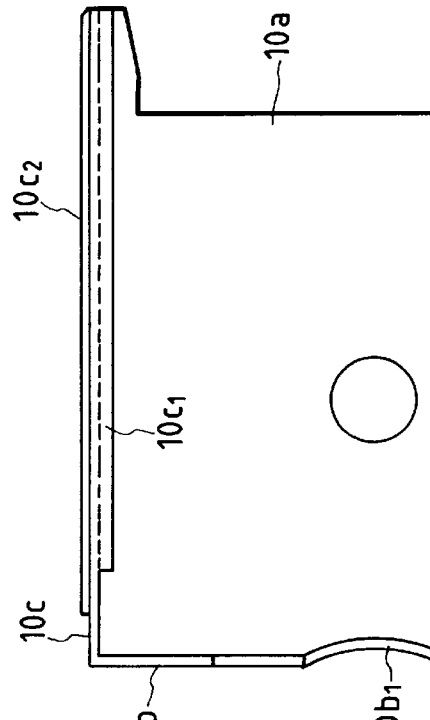
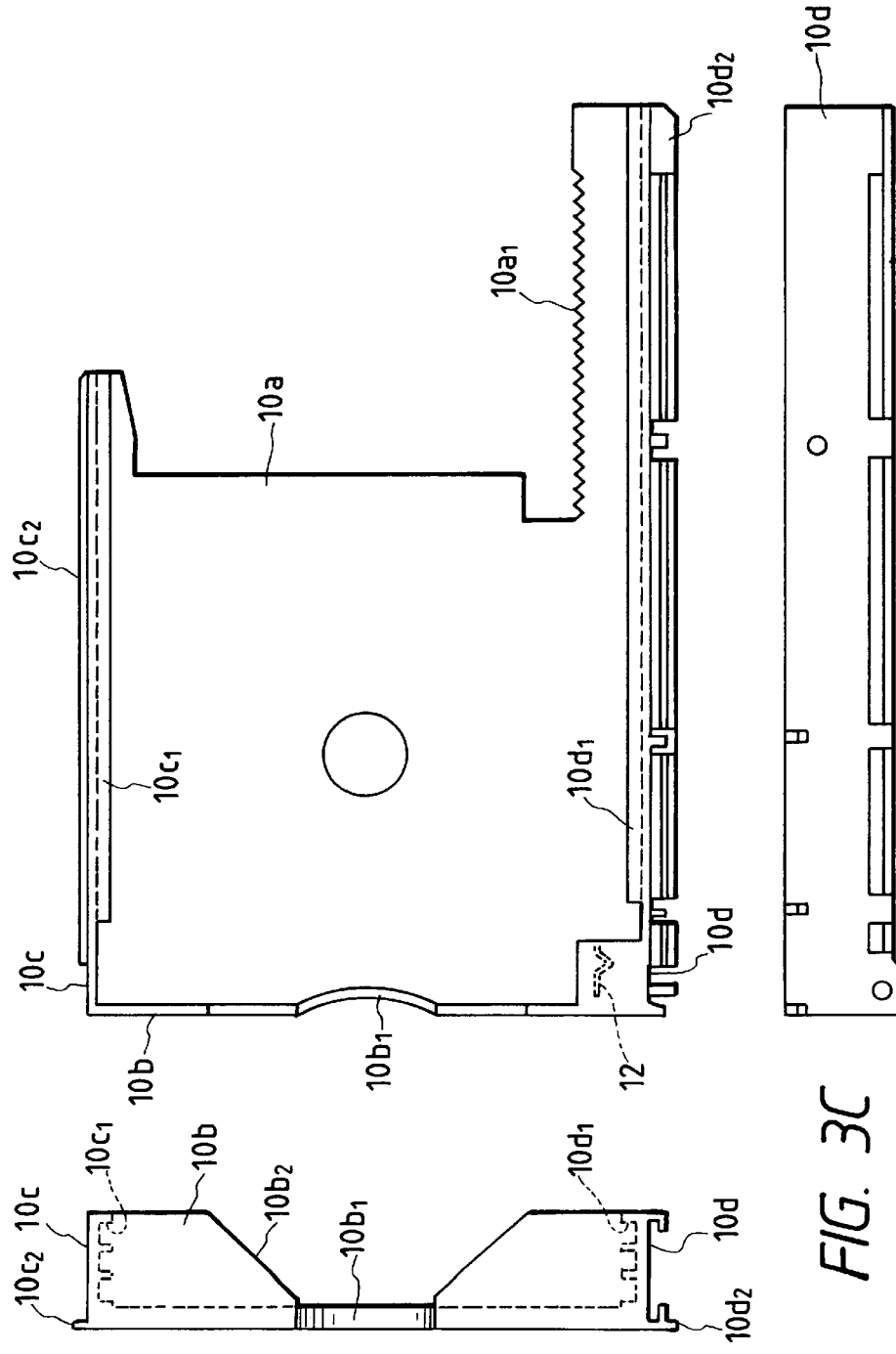
FIG. 3A
FIG. 3B
FIG. 3C

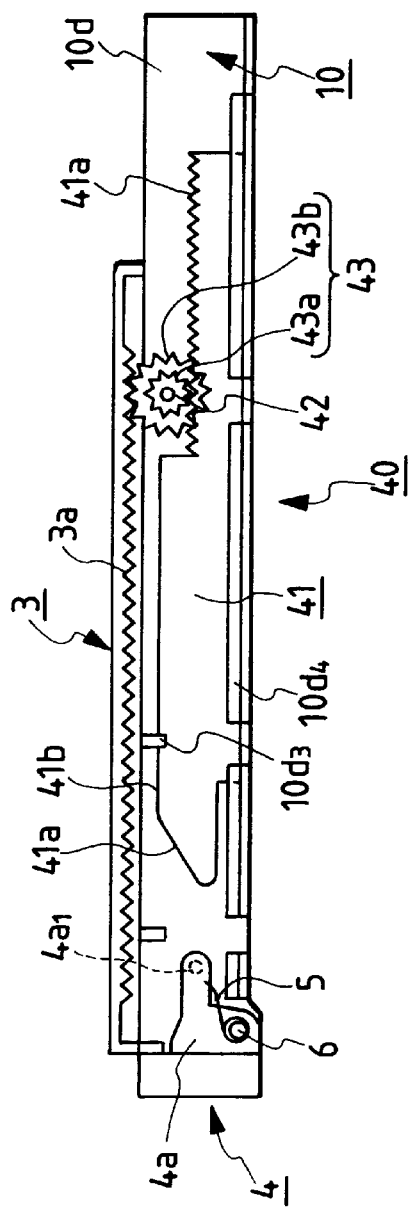
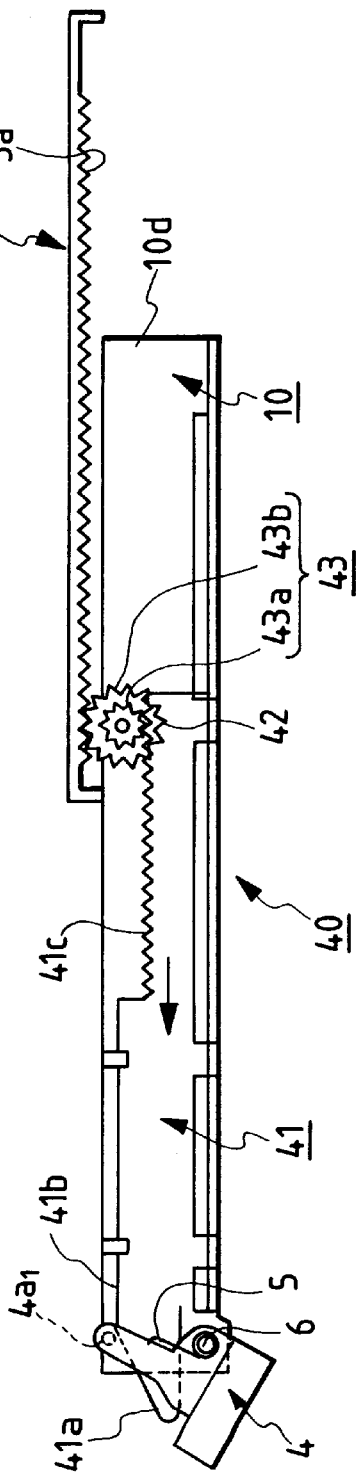

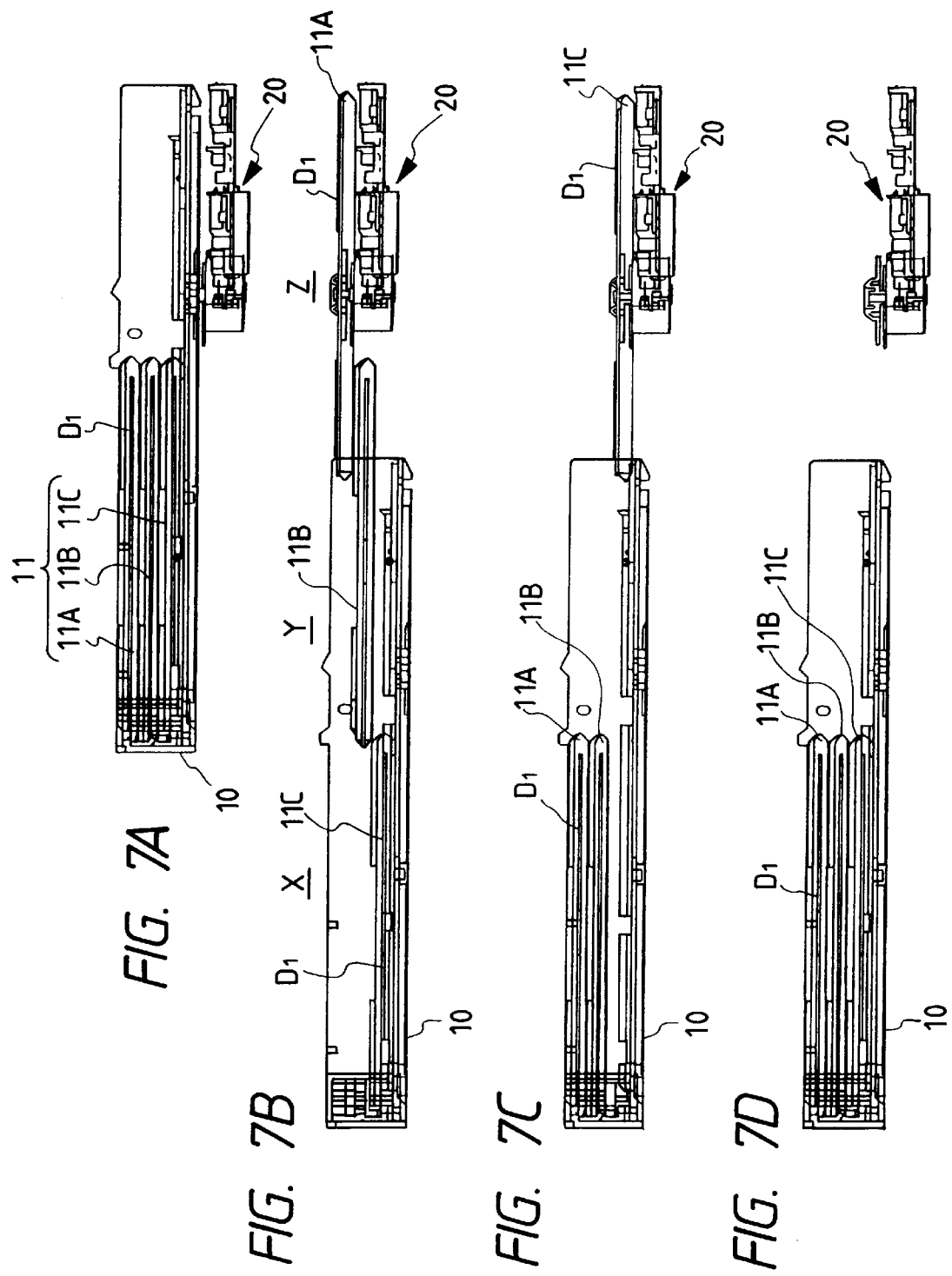

AUTOMATIC DISC PLAYBACK APPARATUS

BACKGROUND OF THE INVENTION

The present invention relates to an automatic disc playback apparatus or a disc player. Various kinds of automatic disc playback apparatuses have been conventionally employed as means for continuous playback of a plurality of discs. Unexamined Japanese Patent Application No. 4-205755, published in 1992, discloses a base tray. A plurality of sub trays, each mounting a disc, are stacked on this base tray.

FIG. 8 is a perspective view showing an appearance of a conventional disc player disclosed in the Unexamined Japanese Patent Application No. 4-205755. FIG. 9 is a plan view illustrating a disc loading operation of the conventional disc player.

As shown in FIG. 8, a disc player 100 has a boxlike player housing 101. A rectangular opening 101a1 is provided on a front face 110a of the player housing 101. A base tray 102 is coupled or engaged in the opening 101a. The base tray 102 is slidable between an external position where the base tray 102 is positioned outside the player housing 101 and a standby position where the base tray 102 is lodged inside the player housing 101.

A plurality of sub trays 103, each mounting a disc D, are stacked on the base tray 102 in an up-and-down direction. Among the plurality of sub trays 103, a desired sub tray 103 is shiftable with respect to the base tray 102. The desired sub tray 103 can thus be transported to the standby position and to a later-described playback position.

Furthermore, as shown in FIG. 9, the above-described disc player 100 comprises a pair of sub tray holders 104 and 105 supporting the right and left sides of the sub tray 103 positioned at the standby position and displaceable in accordance with a pulling motion of the base tray 102 advancing to the external position. A sub tray standby position engaging mechanism and sub tray selecting mechanism 106 is provided to position the desired sub tray 103 at the standby position.

The sub tray 103 mounts the disc D. In one mode, the sub tray 103 advances to the external position together with the base tray 102. In another mode, the sub tray 103, is shifted from the external position to the inside of the player housing 101 and stays at the standby position in the player housing 101. The sub tray holders 104, 105, the sub tray standby position engaging mechanism and sub tray selecting mechanism 106 are cooperative to position the sub tray 103 in the above-described manner. Furthermore, in a still another mode, the sub tray 103 is shifted from the standby position to the playback position.

However, according to the above-described conventional disc player 100, there is a necessity of providing complicated mechanisms for selecting the desired sub tray 103 from the plurality of sub trays 103 stacked on the base tray 102. More specifically, all of the above-described sub tray holders 104 and 105 and the sub tray standby position engaging mechanism and sub tray selecting mechanism 106 are complicated in their constructions. Therefore, a simple mechanism performing the same function is earnestly needed.

Furthermore, according to the above-described conventional disc player 100, the base tray 102 comprises a pair of finger holes 102a and 102a opened at the right and left sides of the front end thereof as shown in FIG. 9. With this arrangement, an operator is allowed to insert fingers into the finger holes 102a and 102a to hold or pinch the outer periphery of the disc D. However, this arrangement is disadvantageous in that the disc D placed on the lowermost sub tray 103 is difficult to hold, because the operator is forced to insert his/her fingers deeply into the finger holes 102a and 102a.

SUMMARY OF THE INVENTION

To accomplish the above and other related objects, one aspect of the present invention provides an automatic disc playback apparatus comprising a base tray shiftable between an external position located outside a casing and a standby position in the casing. A plurality of sub trays are stacked on the base tray in an up-and-down direction for mounting a disc thereon. Position of each sub tray is selectable among three modes. The sub tray is pulled out and located at the external position together with the base tray in a first mode, retained at the standby position in a second mode, and conveyed to a playback position located in the casing in a third mode. The base tray is equipped with a plurality of guide grooves arranged in the up-and-down direction. Each guide groove supports the sub tray at the external position and the standby position. Furthermore, the guide groove guides the sub tray between the external position and the standby position. A sub tray engaging member is provided in the base tray and elastically deformable so as to generate an urging force. A hook is formed on each sub tray. The hook is engageable with the sub tray engaging member under the urging force. The sub tray is disengaged from the sub tray engaging member against the urging force when the sub tray is located at the standby position and the playback position. A sub tray selector is provided in the casing. The sub tray selector is rotatable so as to adjust a selecting position in accordance with the height of a designated sub tray. The sub tray selector is capable of retaining the designated sub tray and any other sub trays stacked thereon and disengaging each of the retained sub trays from the sub tray engaging member in accordance with a shifting motion of the base tray advancing to the external position. Thus, the retained sub trays stay at the standby position.

Preferably, the sub tray engaging member is provided for each of the plurality of sub trays. The sub tray engaging member is provided inside a corner of the base tray where a front plate of the base tray is connected to a side plate of the base tray. Furthermore, the sub tray engaging member is made of a leaf spring bent in a predetermined configuration. The hook formed on each sub tray is configured into a shape engageable with the configuration of the leaf spring by overcoming a resilient force of the leaf spring.

Preferably, the sub tray selecting mechanism is located adjacent to a side of the base tray in the casing. The tray selecting mechanism is located adjacent to a ceiling plate of the casing. More specifically, the sub tray selecting mechanism comprises a sub tray selector rotatably supported on the casing, a torsion spring resiliently urging the sub tray selector in a predetermined rotational direction, and a cam plate slidable in a predetermined direction so that a rotational angle of the sub tray selector can be regulated by the cam plate.

The sub tray selector may comprise a shaft portion rotatably supported on the casing, a cam abutting arm portion brought into contact with the cam plate, and a select arm portion selectively retaining some of the sub trays at the standby position.

The select arm portion may be angularly displaceable along front faces of the sub trays so that the select arm portion can selectively engage with the front faces of the some of the sub trays.

The torsion spring resiliently urges the select arm portion about the shaft portion.

Preferably, the cam plate comprises a central cam face positioned at a lowest height and other cam faces integrally formed at both sides of the central cam face and positioned at an intermediate height and a highest height, so that the cam abutting arm portion of the sub tray selector is selectively engageable with the cam faces.

A second aspect of the present invention provides an automatic disc playback apparatus comprising a base tray shiftable between an external position located outside a casing and a standby position in the casing. A plurality of sub trays are stacked on the base tray in an up-and-down direction for mounts a disc thereon. Position of each sub tray is selectable among three modes. The sub tray is pulled out and located at the external position together with the base tray in a first mode, retained at the standby position in a second mode, and conveyed to a playback position located in the casing in a third mode. Each sub tray has a front face with a partly recessed portion, so that an outer periphery of a disc placed on the sub tray overhangs at the recessed portion. The base tray has a cutout portion at a front part thereof. The cutout portion fits to the recessed portion of the sub tray so that the outer periphery of the disc overhangs at the cutout portion. A front door is displaceable between a closed position and an open position. A spring resiliently urges the front door so as to cover the cutout of the base tray. And, a front door opening mechanism displaces the front door to the open position in accordance with the shifting motion of the base tray advancing to the external position.

Preferably, the front door opening mechanism is provided at a side of the base tray. The front door opening mechanism comprises a slide plate formed with a tapered cam face which displaces the front door. The front door comprises a boss portion slidable along the tapered cam face of the slide plate. The slide plate comprises a rack portion meshing with a gear rotatably supported on the casing.

BRIEF DESCRIPTION OF THE DRAWINGS

The above and other objects, features and advantages of the present invention will become more apparent from the following detailed description which is to be read in conjunction with the accompanying drawings, in which:

FIGS. 2A through 2D are a plan view, a front view, a left side view and a right side view, respectively, showing the automatic disc playback apparatus of the present invention;

FIGS. 3A through 3C are a plan view, a front view and a right side view, respectively, showing a base tray in accordance with the present invention;

FIGS. 6A and 6B are side views illustrating an operation of a front door opening mechanism in accordance with the present invention;

FIGS. 7A through 7D are side views illustrating an operation of the automatic disc playback apparatus in accordance with the present invention;

DESCRIPTION OF THE PREFERRED EMBODIMENT

Figure 1:
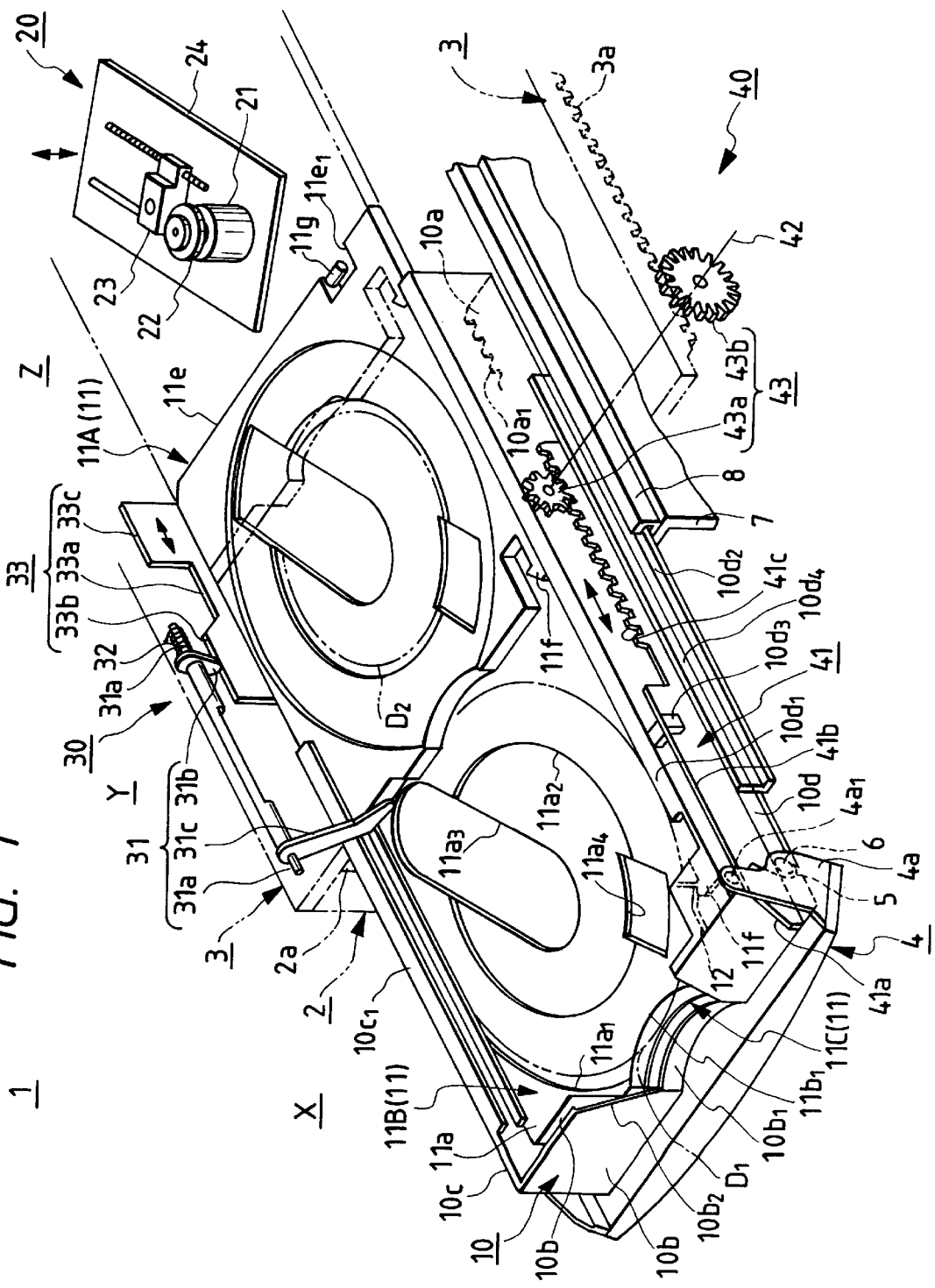
FIG. 1 is a perspective view illustrating an overall arrangement of an automatic disc playback apparatus in accordance with the present invention.

A preferred embodiment of the present invention will be explained with reference to the accompanying drawings. Identical parts are denoted by the same reference numerals throughout the views.

Overall Arrangement of An Automatic Disc Playback Apparatus

FIG. 1 is a perspective view showing an overall arrangement of an automatic disc playback apparatus in accordance with a preferred embodiment of the present invention. FIG. 2A is a plan view showing the automatic disc playback apparatus shown in FIG. 1. FIGS. 2B, 2C and 2D are a front view, a left side view and a right side view showing the same, respectively.

As shown in FIGS. 1 and 2A–2D, an automatic disc playback apparatus 1 in accordance with the present invention comprises a rectangular opening 2a formed at a front side of a casing 2 which serves as a base body. The upper part of the casing 2 is closed by a ceiling plate 3. A base tray 10 is slidably coupled or engaged with the opening 2a of the casing 2. The base tray 10 is slidable between an external position X and a standby position Y. The base tray 10 protrudes forward from the front end of the casing 2 when the base tray 10 is positioned at the external position X. The base tray 10 stays in the casing 2 when the base tray 10 is positioned at the standby position Y.

A front door 4, serving as an essential member of the present invention, is provided at the front end of the base tray 10. The front door 4 is rotatable about an axis 6. A torsion spring 5 resiliently urges the front door 4 toward a predetermined closed position. The front door 4 is installed on the base tray 10. A front door opening mechanism 40 is provided to open the front door 4. A movement of the front door 4, by the front door opening mechanism 40, is linked with a shift motion of the base tray 10 from the standby position Y to the external position X in a pulling-out operation.

A plurality of sub trays 11 are stacked on the base tray 10 with predetermined altitudinal intervals. Each sub tray 11 has an upper surface recessed in a stepped circular configuration capable of securely mounting a disc D1 of 12 cm in diameter or a disc D2 of 8 cm in diameter. According to the embodiment of the present invention, the plurality of sub trays 11 consists of an uppermost sub tray 11A, a middle sub tray 11B and a lowermost sub tray 11C. Each sub tray 11A, 11B, or 11C is integrally shiftable with the base tray 10. The position of each sub tray 11A, 11B, or 11C is selectable among three modes. More specifically, in a first mode, each sub tray 11A, 11B, or 11C is pulled out together with the base tray 10 and located at the external position X. In a second mode, the sub tray 11A, 11B, or 11C is forcibly retained at the standby position Y by a later-described sub tray selecting mechanism 30 irrespective of the pulling-out operation of the base tray 10 to the external position X. The standby position Y is located at a front part in the casing 2. In a third mode, the sub tray 11A, 11B, or 11C is conveyed from the standby position Y to a predetermined playback position Z by a shifting mechanism (not shown). The playback position Z is located at a rear part in the casing 2.

Furthermore, a disc playback section 20 is provided at the above-described playback position Z. The disc playback section 20 is shiftable in an up-and-down direction. More specifically, the disc playback section 20 includes a turn table 22 fixed to an output shaft of a motor 21. Thus, the turn table 22 is rotatable in synchronism with rotation of the motor 21. An optical pickup 23 is provided on a base 24. The optical pickup 23 is slidable in a radial direction of the discs D1 and D2. The disc playback section 20 adjusts its altitudinal position in accordance with the selected sub tray 11A, 11B or 11C located at the above-described playback position Z.

Base Tray

FIGS. 3A through 3C are a plan view, a front view and a right side view, respectively, explaining the base tray 10 in greater detail.

As shown in FIGS. 1 and 3A–3C, the base tray 10 comprises a bottom plate 10$a$. A front plate 10$b$, and left and right side plates 10$c$ and 10$d$ are provided along the periphery of the bottom plate 10$a$. The rear side of the base tray 10, opposing to the playback position Z in the casing 2, is opened. The base tray 10 is integrally formed by a resin member.

A recessed portion 10$b_1$ is formed at substantially the lower center of the front plate 10$b$ of the base tray 10. The recessed portion 10$b_1$ is curved into an arc concave (hereinafter, referred to as "arc recessed portion"). A cutout portion 10$b_2$ is formed above the arc recessed portion 10$b_1$. The cutout portion 10$b_2$ is configured into a trapezoid (hereinafter, referred to as "trapezoidal cutout portion"). The shape of both the arc recessed portion 10$b_1$ and the trapezoidal cutout portion 10$b_2$ corresponds to an arc shape of a recessed portion (hereinafter, referred to as "arc recessed portion") 11$b_1$ formed at substantially the center of a front face 11$b$ of the sub tray 11. Details of the recessed portion 11$b_1$ will be described later.

When the 12 cm diameter disc D1 is placed on the sub tray 11, part of the outer periphery of the disc D1 protrudes or overhangs to the trapezoidal cutout portion 10$b_2$ of the base tray 10. Thus, the trapezoidal cutout portion 10$b_2$ allows an operator of the automatic disc playback apparatus to hold the edge of the disc D1 by his/her fingers.

The front door 4 is supported at the left and right side plates 10$c$ and 10$d$ of the base tray 10, and swingable so as to open or close the arc recessed portion 10$b_1$ and the trapezoidal cutout portion 10$b_2$. Details of the open-and-close operation of the front door 4 will be described later.

Guide grooves 10$c_1$ and 10$d_1$ are formed on the inside surfaces of the left and right side plates 10$c$ and 10$d$ of the base tray 10. The guide grooves 10$c_1$ and 10$d_1$ are configured into opposed rectangular grooves (hereinafter, referred to as "rectangular guide groove"). The rectangular guide grooves 10$c_1$ and 10$d_1$ of three stages are stacked in the up-and-down direction. Guide rails 11$c_1$ and 11$d_1$ (described later with reference to FIGS. 4A–4C) of the sub tray 11 are supported by the rectangular guide grooves 10$c_1$ and 10$d_1$ so as to be slidable along the longitudinal direction of the rectangular guide grooves 10$c_1$ and 10$d_1$. The rectangular guide grooves 10$c_1$ and 10$d_1$ of the base tray 10 are longer than the guide rails 11$c_1$ and 1$d_1$ (FIGS. 4A–4C) of the sub tray 11. The rectangular guide groove 10$d_1$ provided on the right side plate 10$d$ is longer than the rectangular guide groove 10$c_1$ provided on the left side plate 10$c$. With this arrangement, the sub tray 11 is supported at its both ends by the long rectangular guide grooves 10$c_1$ and 10$d_1$, formed on the base tray 10, at the standby position Y in the casing 2 even when the base tray 10 is pulled out and located at the external position X. Furthermore, the sub tray 11 is supported at its both ends by the long rectangular guide grooves 10$c_1$ and 10$d_1$ of the base tray 10, even when the base tray 10 is lodged in the casing 2 and the sub tray 11 is shifted from the standby position Y to the playback position Z.

A total of three sub tray engaging members 12 are provided for respective three stages at the inside of a corner of the base tray 10 where the front plate 10$b$ is connected to the right side plate 10$d$. Each sub tray engaging member 12 is elastically deformable and engages with the associated sub tray 11 (11A to 11C).

The sub tray engaging member 12 is made of a well-known leaf spring elastically deformable. The front end of the leaf spring is bent into a V-shaped configuration. Each sub tray 11 has a reverse V-shaped hook 11$f$ (refer to FIG. 4A) which will be described in more detail. The hook 11$f$ of each sub tray 11 is independently engageable with the associated sub tray engaging member 12 of the base tray 10 by overcoming a resilient force of the leaf spring. The resilient force of the sub tray engaging member 12 is set to a predetermined level so that the sub tray 11 is disengaged from the base tray 10 in a selecting operation where the sub tray 11 is retained at the standby position Y located in the casing 2 after releasing the engagement with the base tray 10. Furthermore, the sub tray 11 is releasable from the base tray 10 in a shifting operation where the sub tray 11 is conveyed to the playback position Z.

Furthermore, the bottom 10$a$ protrudes or extends outward with a small width from both the outer lower ends of the left and right side plates 10$c$ and 10$d$ of the base tray 10. The long and narrow protruding portions of the bottom 10$a$ serve as guide plates 10$c_2$ (not shown in FIG. 1) and 10$d_2$, respectively. These guide plates 10$c_2$ and 10$d_2$ are coupled with rectangular base tray guide members 8, respectively. The base tray guide members 8 are provided on a chassis 7 so as to oppose each other (although FIG. 1 does not show the one provided on the left side plate). With this engagement, the base tray 10 can cause a reciprocative motion on the chassis 7 between the external position X located outside the casing 2 and the standby position Y located in the casing 2. The base tray 10 is reciprocated by a motor (not shown) provided on the chassis 7. A rack portion 10$a_1$ is formed on the bottom plate 10$a$ inside and along the right side plate 10$d$ of the base tray 10. A pinion gear (not shown) connected to the motor meshes with the rack portion 10$a_1$. Thus, a driving force of the motor is transmitted to the base tray 10. To allow an operator to manually move the base tray 10, an appropriate reduction gear ratio is given between the base tray 10 and the pinion (not shown) of the motor (not shown).

Sub Tray

Figure 4B:
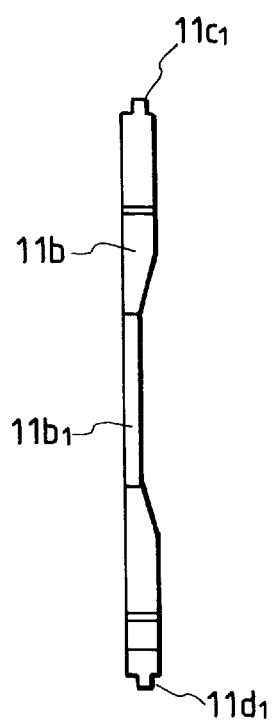
FIGS. 4A through 4C are a plan view, a front view and a right side view, respectively, showing a sub tray in accordance with the present invention.
Figure 4A:
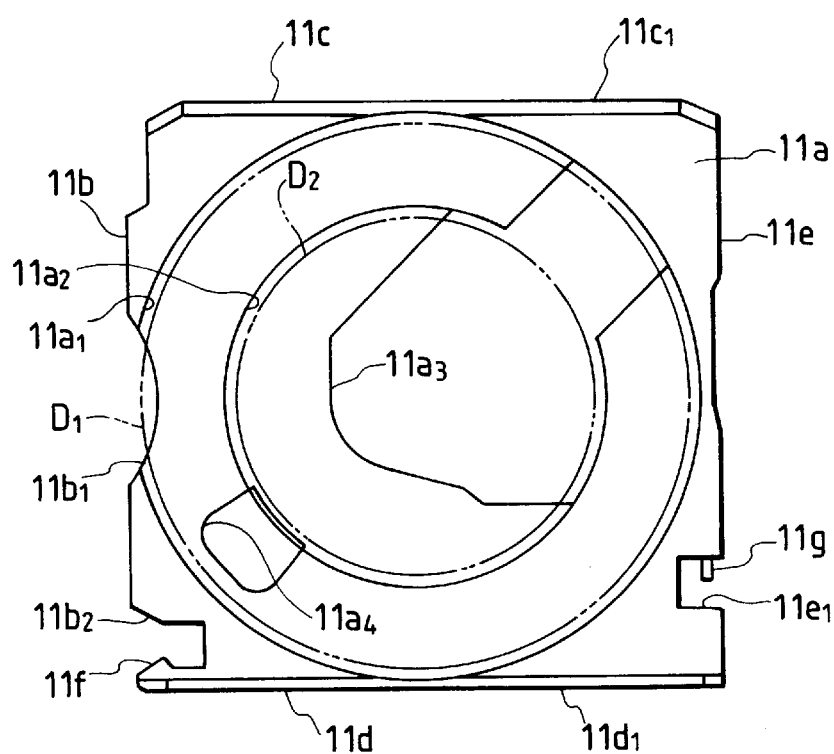
Figure 4C:
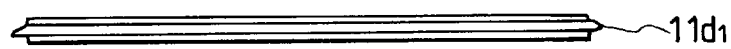

FIGS. 4A through 4C are a plan view, a front view and a right side view, respectively, explaining the sub tray of the present invention.

As shown in FIGS. 1 and 4A–4C, each sub tray 11 (i.e., 11A–11C) is a resin product integrally formed into a rectangular plate.

An upper surface 11$a$ of the sub tray 11 is recessed into a predetermined stepped configuration. A large circular recess 11$a_1$ is formed on the upper surface 11$a$ of the sub tray 11. The disc D1 of 12 cm diameter is placed in this large circular recess 11$a_1$. A small circular recess 11$a_2$ is formed coaxially with the large circular recess 11$a_1$ at a height stepped down from the level of the large circular recess 11$a_1$. The disc D2 of 8 cm diameter is placed in this small circular recess 11$a_2$. An undercut 11$a_3$ is provided extensively from the center to the large circular recess 11$a_1$. The undercut 11$a_3$ has a size sufficiently large to allow the disc playback section 20 to move in the up-and-down direction through the undercut $11a_3$ without interference. Furthermore, a finger hole $11a_4$ is opened on the upper surface $11a$ of the sub tray 11. The finger hole $11a_4$ bridges the large circular recess $11a_1$ and the small circular recess $11a_2$, so as to allow the operator to hold the 8 cm diameter disc D2 by his/her fingers.

Furthermore, the arc recessed portion $11b_1$ is recessed inward at substantially the center of the front face $11b$ of the sub tray 11. When the 12 cm diameter disc D1 is placed on the sub tray 11, part of the outer periphery of the disc D1 protrudes or overhangs from the sub tray 11. Thus, the operator can hold or pinch the edge of the disc D1 by inserting his/her fingers through the trapezoidal cutout portion $10b_2$.

Long and narrow guide rails $11c_1$ and $11d_1$ are provided along the left and right side faces $11c$ and $11d$ of the sub tray 11. The above-described rectangular guide grooves $10c_1$ and $10d_1$ of the base tray 10 guide these guide rails $11c_1$ and $11_{d1}$.

Furthermore, a recessed portion $11b_2$ of a substantially rectangular cutout is formed at a predetermined position of the front face $11b$ of the sub tray 11 adjacent to the right side face $11d$. The above-described reverse V-shaped hook $11f$ is formed in the vicinity of the corner of the sub tray 11 where the front face $11b$ is connected to the right side face $11d$. The reverse V-shaped hook $11f$ protrudes toward the recessed portion $11b_2$ and engageable with the above-described sub tray engaging member 12 of the base tray 10.

Furthermore, a recessed portion $11e_1$ of a substantially rectangular cutout is formed as at a predetermined position of a rear face $11e$ of the sub tray 11 adjacent to the right side face $11d$. There is a boss $11g$ protruding into the recessed portion $11e_1$. The boss $11g$ is engageable with a pulling means (not shown) when the sub tray 11 is conveyed from the standby position Y to the playback position Z in the casing 2.

Sub Tray Selecting Mechanism

Figure 5A:
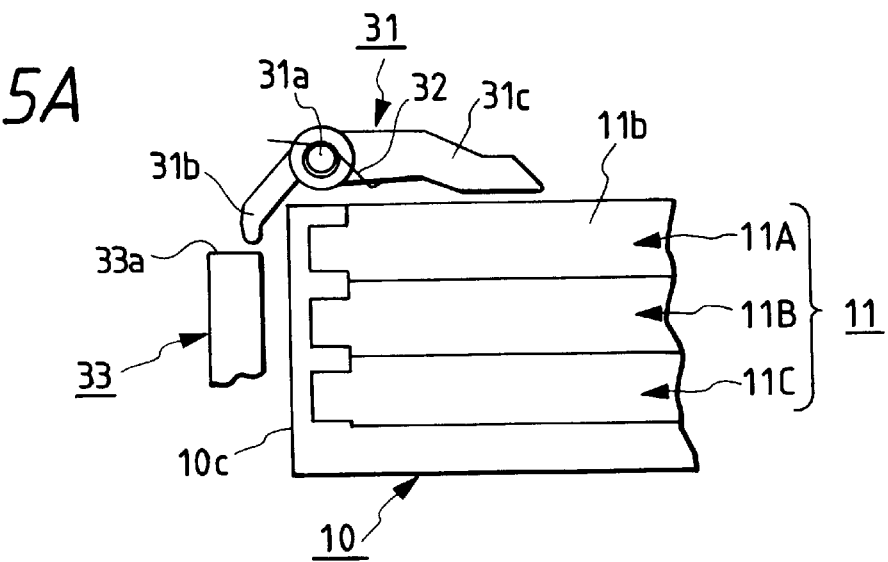
FIGS. 5A through 5C are front views illustrating an operation of a sub tray selecting mechanism in accordance with the present invention.
Figure 5B:
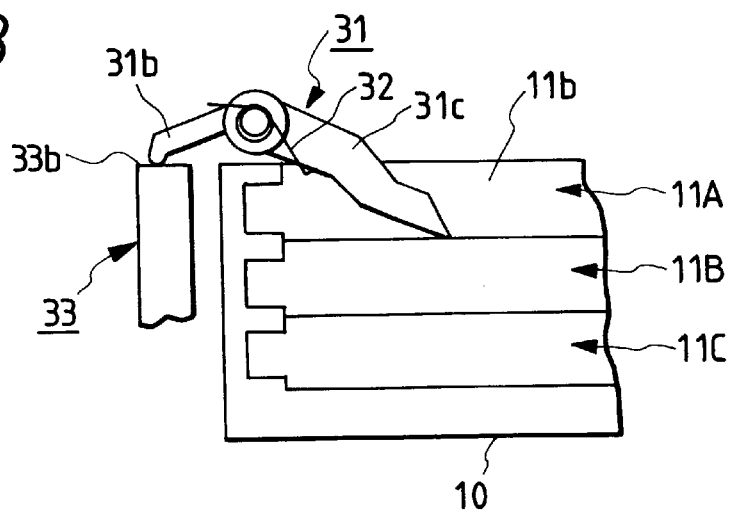
Figure 5C:
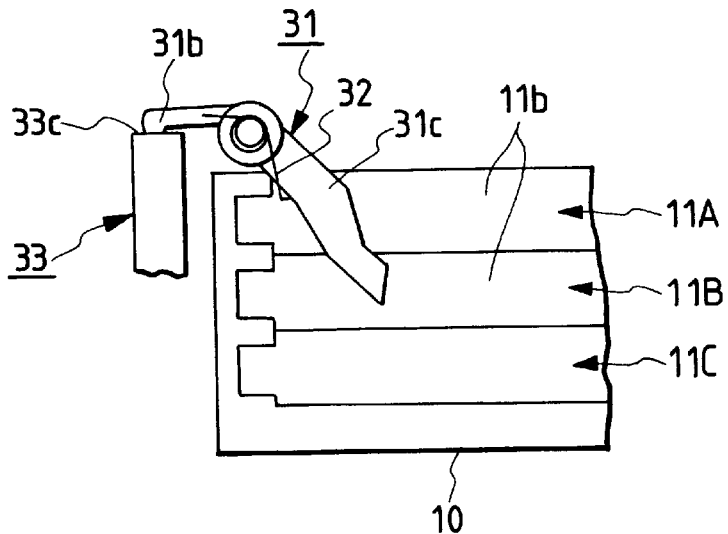
Figure 8:
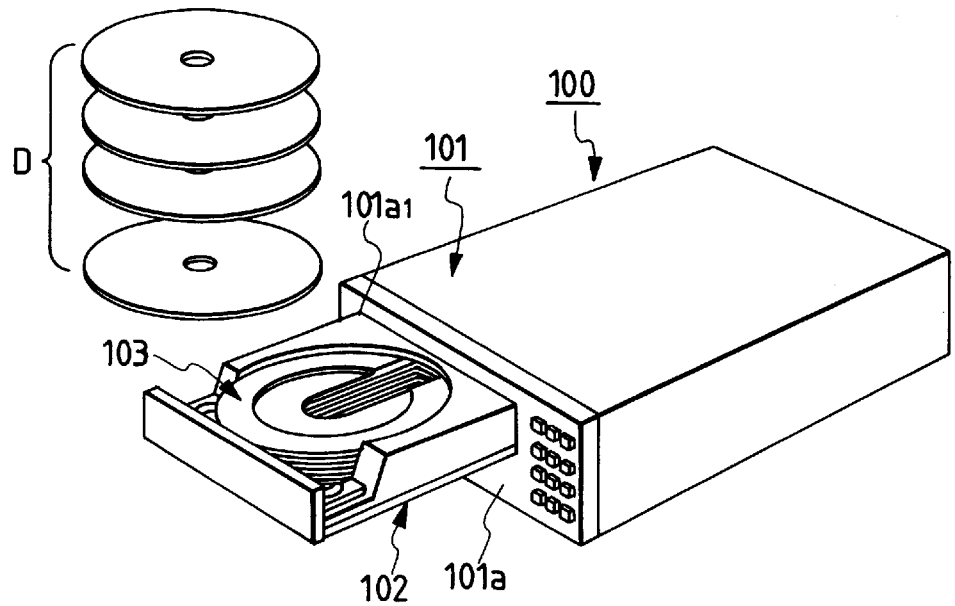
FIG. 8 is a perspective view showing an appearance of one example of a conventional disc player.
Figure 9:
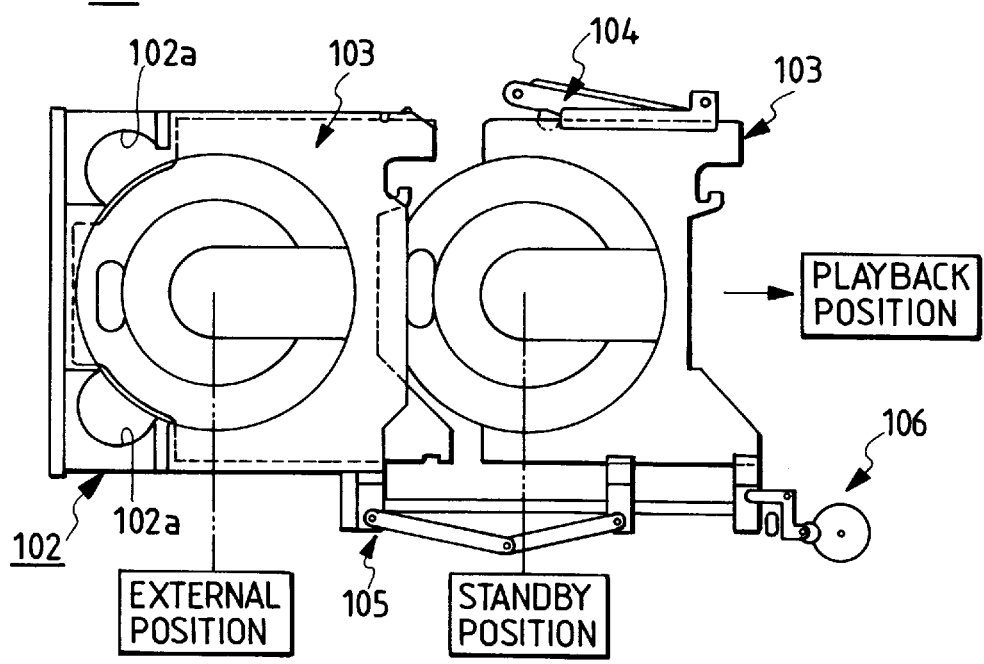
FIG. 9 is a plan view illustrating a disc loading operation of the conventional disc player shown in FIG. 8.

FIGS. 5A through 5C are front views illustrating an operation of the sub tray selecting mechanism of the present invention.

As shown in FIG. 1, the sub tray selecting mechanism 30 is provided in the casing 2 and rotatable about an axis. Thus, the position of the sub tray selecting mechanism 30 is adjustable in accordance with the height of each sub tray 11 stacked in the casing 2. A plurality of sub trays 11 are engaged with the sub tray engaging members 12 in the base tray 10. When one of the sub trays 11 is designated, there may be one or a plurality of sub trays positioned above the designated sub tray 11. When the base tray 10 is shifted to the external position X, the sub tray selecting mechanism 30 disengages the designated sub tray 11 and all the sub trays 11 positioned above the designated sub tray 11 from their associated sub tray engaging members 12 and makes them stay at the standby position Y. In other words, the sub tray selecting mechanism 30 has a function of selecting some of the plurality of sub trays 11 in response to the shifting motion of the base tray 10 advancing to the external position X.

The sub tray selecting mechanism 30 is located adjacent to the left side plate $10c$ of the base tray 10 in the casing 2, adjacent to the left side face $11c$ of the sub tray 11, and adjacent to the reverse surface of the ceiling plate 3.

More specifically, the sub tray selecting mechanism 30 comprises a sub tray selector 31 rotatably supported on the reverse surface of the ceiling plate 3. A torsion spring 32 resiliently urges the sub tray selector 31 in a predetermined rotational direction. A cam plate 33 is slidable in an up-and-down direction. The rotational angle of the sub tray selector 31 is regulated by this slidable cam plate 33. Thus, the height of the sub tray selector 31 is adjustable in response to each selection of sub trays 11A through 11C.

Shafts portions $31a$ and $31a$ are rotatably supported at the front and rear ends of the reverse surface of the ceiling plate 3. A cam abutting arm portion $31b$ is provided inside the rear shaft $31a$. The cam abutting arm portion $31b$ is brought into contact with a cam plate 33. A select arm portion $31c$ is formed inside the front shaft $31a$ and opposed to the cam abutting arm portion $31b$ via the shaft $31a$. The select arm portion $31c$ has a function of selectively retaining some of the sub trays 11 (11A to 11C) at the standby position Y from the condition where these sub trays 11 are engaged with the base tray 10. The shaft portions $31a$ and $31a$, the cam abutting arm portion $31b$, and the select arm portion $31c$ are integrally formed to constitute the sub tray selector 31.

The select arm portion $31c$ is located at a predetermined angular position when the base tray 10 is lodged in the casing 2. More specifically, the select arm portion $31c$ protrudes from the outside to the inside of the left side plate $10c$ of the base tray 10 and the left side face $11c$ of the sub tray 11. And, the select arm portion $31c$ is shiftable between the reverse surface of front plate $10b$ of the base tray 10 and the front face $11b$ of the sub tray 11. With this arrangement, the select arm portion $31c$ of the sub tray selector 31 can engage or contact with the front face $11b$ of the sub tray 11 which is engaged with the base tray 10. Accordingly, the sub tray 11, when retained by the select arm portion $31c$, is forcibly disengaged from the base tray 10 in accordance with a later-described shifting motion of the base tray 10 advancing to the external position X (i.e., a pulling operation). Therefore, the retained sub tray 11 stays at the standby position Y in the casing 2.

Furthermore, the torsion spring 32 resiliently urges the select arm portion $31c$ in an upward (i.e., counterclockwise) direction about the shaft portions $31a$ and $31a$ provided at the both ends of the sub tray selector 31.

Furthermore, a sub tray selecting button (not shown) is provided to select a desired sub tray 11. The cam plate 33 is slidable in an arrow direction of the drawing in response to the selection by the sub tray selecting button. The cam plate 33 comprises a central cam face $33a$ positioned at the lowest height. Another cam faces $33b$ and $33c$ are integrally formed at both sides of the central cam face $33a$. The cam face $33b$ is positioned at an intermediate height. The cam face $33c$ is positioned at the highest height. The cam abutting arm portion $31b$ of the sub tray selector 31 is selectively engageable with these cam faces $33a$ to $33c$.

FIG. 5A shows an initial condition. In this initial condition, the base tray is pulled out to the external position X with the three sub trays 11A to 11C engaged and stacked thereon. The disc D1 or D2 placed on the uppermost sub tray 11A can be exchangeable with other disc in this condition. In this case, the cam abutting arm portion $31b$ of the sub tray selector 31 is brought into contact with the lowest cam face $33a$ of the cam plate 33. The select arm portion $31c$ of the sub tray selector 31 is resiliently urged by the torsion spring 32 about the shaft $31a$ until the select arm portion $31c$ reaches a predetermined retracted portion above the front face $11b$ of the uppermost sub tray 11A. Thus, all of three sub trays 11A to 11C are pulled out together with the base tray 10 to the external position X.

FIG. 5B shows a condition where only the uppermost sub tray 11A stays at the standby position Y, while the middle and lowermost sub trays 11B and 11C are pulled out together with the base tray 10 to the external position X. In this case, the cam abutting arm portion 31b of the sub tray selector 31 is brought into contact with the middle cam face 33b of the cam plate 33. The select arm portion 31c of the sub tray selector 31 rotates against the resilient force of the torsion spring 32 and angularly moves to a position where the front face 11b of the uppermost sub tray 11A is retained by the sub tray selector 31. Accordingly, only the uppermost sub tray 11A is disengaged from the base tray in response to the shifting motion of the base tray 10 and is left at the standby position Y in the casing 2.

FIG. 5C shows a condition where both of the uppermost and middle sub trays 11A and 11B are left at the standby position Y, while the lowermost sub tray 11C is pulled out together with the base tray 10 to the external position X. In this case, the cam abutting arm portion 31b of the sub tray selector 31 is brought into contact with the highest cam face 33c of the cam plate 33. The select arm portion 31c of the sub tray selector 31 rotates further against the resilient force of the torsion spring 32 and angularly moves to another position where the front faces 11b of the uppermost and middle sub trays 11A and 11B are retained by the sub tray selector 31. Accordingly, both of the uppermost and middle sub trays 11A and 11B are disengaged from the base tray 10 in response to the shifting motion of the base tray 10 and are selectively left at the standby position Y in the casing 2.

As described above, the sub tray selecting mechanism 30 of the present invention is simple in construction compared with the conventional art. With this simple construction, it becomes possible to make the designated sub tray 11 stay at the standby position Y in the casing 2. Furthermore, the selecting operation of the sub trays 11 can be simplified. The total number of parts of the apparatus 1 can be decreased.

Front Door Opening Mechanism

FIGS. 6A and 6B are side views illustrating an operation of the front door opening mechanism of the present invention.

As shown in FIGS. 1 and 6A–6B, the front door opening mechanism 40 has a function of opening the front door 4 in accordance with the shifting motion of the base tray 10 advancing to the external position X. The front door 4 is resiliently urged by a spring and supported by the base tray 10 so as to open or close the front side of the base tray 10. More specifically, the front plate 10b of the base tray 10 is partly formed into the trapezoidal cutout portion $10b_2$. When the disc D1 is placed on the sub tray 11, the outer periphery of the disc D1 closely faces the trapezoidal cutout portion $10b_2$. The front door 4 covers the trapezoidal cutout portion $10b_2$. The opening motion of the front door 4 is linked with the shifting motion of the base tray 10 advancing to the external position X by the front door opening mechanism 40.

Namely, the above-described front door opening mechanism 40 is located adjacent to the right side plate 10d of the base tray 10 and adjacent to the reverse surface of the ceiling plate 3.

Furthermore, the front door opening mechanism 40 comprises a slide plate 41 adjacent to the right side plate 10d of the base tray 10. Guide walls $10d_3$ and $10d_4$ are integrally formed with the right side plate 10d. The guide wall $10d_3$ is located higher than the other guide wall $10d_4$ so as to cooperatively guide the slide plate 41 in a direction indicated by an arrow. The front part of the slide plate 41 is formed into a taper cam face 41a and a parallel cam face 41b. The parallel cam face 41b is continuously connected to the upper end of the taper cam face 41a. A circular boss $4a_1$ is provided at the right side surface 4a of the front door 4. The taper cam face 41a pushes the circular boss $4a_1$. The circular boss $4a_1$ slides along the ascending slope of the taper cam face 41a. With this oblique sliding motion of the circular boss $4a_1$, the front door 4 rotates about a shaft 6 against a resilient force of the torsion spring 5. The rear part of the slide plate 41 is formed into a rack portion 41c at a height lower than the parallel cam face 41b.

A shaft 42 is provided on the right side plate 10d of the base tray 10. The shaft 42 rotatably supports a composite gear 43 integrally and coaxially forming a small gear portion 43a and a large gear portion 43b. The small gear portion 43a of the composite gear 43 meshes with the rack portion 41c of the slide plate 41. On the other hand, the large gear portion 43b meshes with a rack portion 3a formed on the reverse surface of the ceiling plate 3. Accordingly, the composite gear 43 can rotate in accordance with the shifting motion of the base tray 10 advancing to the external position X.

FIG. 6A shows a condition where the base tray 10 is lodged in the casing 2. The front door 4 is provided at the front side of the base tray 10. The front door 4 is rotatable about the shaft 6. In this condition, the front door 4 is resiliently urged by the torsion spring 5 to the closed position. On the other hand, the slide plate 41 is slidable along the right side plate 10d of the base tray 10. In this condition, the slide plate 41 is retracted at an inward position. The slide plate 41 is thus spaced far from the front door 4.

FIG. 6B shows a condition where the base tray 10 is pulled out of the casing 2. The large gear portion 43b meshes with the rack portion 3a formed on the reverse surface of the ceiling plate 3, and rotates in accordance with the shifting motion of the base tray 10 advancing to the external position X. The small gear portion 43a rotates integrally with the large gear portion 43b. The small gear portion 43a meshes with the rack portion 41c of the slide plate 41. Thus, the slide plate 41 slides forward (i.e., to the left in the drawing). The taper cam face 41a is formed at the front part of the slide plate 41. The circular boss $4a_1$ is provided on the right side surface 4a of the front door 4. The taper cam face 41a pushes the circular boss $4a_1$ against the resilient force of the torsion spring 5. The circular boss $4a_1$ rotates upward about the shaft 6 and reaches the parallel cam face 41b. Thus, the front door 4 is completely opened.

When the base tray 10 is located at the external position X, the operator can hold the outer periphery of the disc D1 placed on the sub tray 11. Especially, compared with the prior art, the above-described embodiment makes it easy to hold the disc D1 placed on the lowermost sub tray 11C.

Operation Of Automatic Dis Playback Apparatus

FIGS. 7A through 7D are side views explaining an operation of the automatic disc playback apparatus in accordance with the present invention.

FIG. 7A shows an initial condition of the automatic disc playback apparatus 1. The base tray 10 is lodged in the casing 2. Three sub trays 11A through 11C, each mounting the disc D1, are engagedly stacked on the base tray 10 and stay at the standby position Y in the casing 2.

On the other hand, the disc playback section 20 reproduces or plays the disc D1. The disc playback section 20 is located at the playback position Z in the casing 2 but lowered by a predetermined height.

FIG. 7B shows a condition where the lowermost sub tray 11C engages with the base tray 10 and the base tray 10 is pulled out of the casing 2 and located at the external position X. This condition allows the operator to exchange the disc D1 placed on the lowermost sub tray 11C with other one. The middle sub tray 11B stays at the standby position Y in the casing 2. The uppermost sub tray 11A is shifted in an opposite direction and located at the playback position Z. In this case, the disc playback section 20 is lifted to a higher position corresponding to the uppermost sub tray 11A.

FIG. 7C shows a condition where the base tray 10 is pulled out of the casing 2 together with the uppermost and middle sub trays 11A and 11B and located at the external position X. The lowermost sub tray is shifted in the opposite direction and located at the playback position Z in the casing 2. In this case, the disc playback section 20 is lowered to a lower position corresponding to the lowermost sub tray 11C.

FIG. 7D is a condition where the base tray 10 is pulled out of the casing 2 together with all of three sub trays 11A through 11C and located at the external position X. This condition allows the operator to exchange the disc D1 placed on the uppermost sub tray 11A with other one.

As explained in the foregoing description, the present invention provides an automatic disc playback apparatus. According to the present invention, the sub tray selector is provided in the casing and rotatable so as to adjust its selecting position in accordance with the height of a designated sub tray. The sub tray selector is capable of retaining the designated sub tray and any other sub trays stacked thereon and disengaging each of the retained sub trays from the sub tray engaging member in accordance with the shifting motion of the base tray advancing to the external position. Thus, the retained sub trays stay at the standby position. The arrangement of the present invention is simple compared with the prior art. The sub tray surely stays at the standby position in the casing. The sub tray selecting operation can be simplified. The number of parts of the apparatus can be reduced.

Furthermore, according to the present invention, the base tray has the cutout portion at the front part thereof. The outer periphery of the disc placed on the sub tray overhangs to the cutout portion. The front door is supported by the base tray so as to be displaceable between the closed position and the open position. The spring resiliently urges the front door to cover the cutout of the base tray. And, the front door opening mechanism displaces the front door to the open position in accordance with the shifting motion of the base tray advancing to the external position. Thus, the operator can easily hold or pick up the outer periphery of the disc placed on the sub tray by his/her fingers when the base tray is pulled out and located at the external position. Especially, compared with the prior art, the arrangement of the present invention makes it easy to hold or pick up the disc placed on the lowermost sub tray.

This invention may be embodied in several forms without departing from the spirit of essential characteristics thereof. The present embodiment as described is therefore intended to be only illustrative and not restrictive, since the scope of the invention is defined by the appended claims rather than by the description preceding them. All changes that fall within the metes and bounds of the claims, or equivalents of such metes and bounds, are therefore intended to be embraced by the claims.

What is claimed is:

1. An automatic disc playback apparatus comprising
   a base tray shiftable between an external position located outside a casing and a standby position in said casing;
   a plurality of sub trays stacked on said base tray in an up-and-down direction for mounting a disc thereon, a position of each sub tray being selectable among three modes, wherein each of said sub trays is pulled out and located at said external position together with said base tray in a first mode, retained at said standby position in a second mode, and conveyed to a playback position located in said casing third mode;
   a plurality of guide grooves provided in said base tray and arranged in the up-and-down direction, respective ones of said guide grooves supporting each of said sub trays between said external position and said standby position;
   a sub tray engaging member provided in said base tray and elastically deformable so as to generate an urging force;
   a hook formed on each of said sub trays and being engageable with said sub tray engaging member under said urging force, while each of said sub trays is disengageable from said sub tray engaging member against said urging force when said sub tray is located at said standby position and said playback position; and
   a sub tray selecting mechanism provided in said casing and rotatable so as to adjust a selecting position in accordance with the height of a designated one of said sub trays, said sub tray selecting mechanism being capable of retaining said designated sub tray and any other sub trays stacked thereon and disengaging each of the retained sub trays from said sub tray engaging member in accordance with a shifting motion of said base tray advancing to the external position, thereby making said retained sub trays stay at the standby position.

2. The automatic disc playback apparatus in accordance with claim 1, wherein said sub tray engaging member is provided for each of said plurality of sub trays.

3. The automatic disc playback apparatus in accordance with claim 1, wherein said sub tray engaging member is provided inside a corner of said base tray where a front plate of said base tray is connected to a side plate of said base tray.

4. The automatic disc playback apparatus in accordance with claim 1, wherein said sub tray engaging member is made of a leaf spring bent in a predetermined configuration, while said hook formed on each sub tray is configured into a shape engageable with said configuration of said leaf spring by overcoming a resilient force of said leaf spring.

5. The automatic disc playback apparatus in accordance with claim 1, wherein said sub tray selecting mechanism is located adjacent to a side of said base tray in said casing.

6. The automatic disc playback apparatus in accordance with claim 1, wherein said sub tray selecting mechanism is located adjacent to a ceiling plate of said casing.

7. The automatic disc playback apparatus in accordance with claim 1, wherein said sub tray selecting mechanism comprises a sub tray selector rotatably supported on said casing, a torsion spring resiliently urging said sub tray selector in a predetermined rotational direction, and a cam plate slidable in a predetermined direction so that a rotational angle of said sub tray selector can be regulated by said cam plate.

8. The automatic disc playback apparatus in accordance with claim 7, wherein said sub tray selector comprises a shaft portion rotatably supported on said casing, a cam abutting arm portion brought into contact with said cam plate, and a select arm portion selectively retaining some of said sub trays at said standby position.

9. The automatic disc playback apparatus in accordance with claim 8, wherein said select arm portion is angularly displaceable along front faces of said sub trays so that said select arm portion can selectively engage with the front faces of said some of said sub trays.

10. The automatic disc playback apparatus in accordance with claim 8, wherein said torsion spring resiliently urges said select arm portion about said shaft portion.

11. The automatic disc playback apparatus in accordance with claim 8, wherein said cam plate comprises a central cam face positioned at a lowest height and other cam faces integrally formed at both sides of said central cam face and positioned at an intermediate height and a highest height, so that said cam abutting arm portion of the sub tray selector is selectively engageable with said cam faces.

12. An automatic disc playback apparatus comprising
   a base tray shiftable between an external position located outside a casing and a standby position in said casing;
   a plurality of sub trays stacked on said base tray in an up-and-down direction for mounting a disc thereon, a position of each sub tray being selectable among three modes, wherein each of said sub trays is pulled out and located at said external position together with said base tray in a first mode, retained at said standby position in a second mode, and conveyed to a playback position located in said casing in a third mode;
   a recessed portion partly formed on a front face of said sub trays so that an outer periphery of a disc placed on said sub tray overhangs at said recessed portion;
   a cutout portion formed at a front part of said base tray, said cutout portion fitting to said recessed portion of said sub trays so that the outer periphery of said disc overhangs at said cutout portion;
   a front door supported by said base tray and rotatable about a shaft to be displaceable between a closed position and an open position, with a spring resiliently urging said front door so as to cover said cutout portion of said base tray; and
   a front door opening mechanism displacing said front door to said open position in accordance with a shifting motion of said base tray advancing to said external position.

13. The automatic disc playback apparatus in accordance with claim 12, wherein said front door opening mechanism is provided at a side of said base tray.

14. The automatic disc playback apparatus in accordance with claim 12, wherein said front door opening mechanism comprises a slide plate formed with a tapered cam face which displaces said front door.

15. The automatic disc playback apparatus in accordance with claim 14, wherein said front door comprises a boss portion slidable along said tapered cam face of said slide plate.

16. The automatic disc playback apparatus in accordance with claim 14, wherein said slide plate comprises a rack portion meshing with a gear rotatably supported on said casing.

* * * * *

UNITED STATES PATENT AND TRADEMARK OFFICE
CERTIFICATE OF CORRECTION

PATENT NO. : 5,970,036
DATED : October 19, 1999
INVENTOR(S) : Hiroshi MATSUGASE

It is certified that error appears in the above-identified patent and that said Letters Patent is hereby corrected as shown below:

Column 11, Claim 1, please amend as follows:

1. An automatic disc playback apparatus comprising:

a base tray shiftable between an external position located outside a casing and a standby position in said casing;

a plurality of sub trays stacked on said base tray in an up-and-down direction for mounting a disc thereon, a position of each sub tray being selectable among three modes, wherein each of said sub trays is pulled out and located at said external position together with said base tray in a first mode, retained at said standby position in a second mode, and conveyed to a playback position located in said casing in a third mode;

a plurality of guide grooves provided in said base tray and arranged in the up-and-down direction, respective ones of said guide grooves supporting each of said sub trays at said external position and said standby position and further guiding each of said sub trays between said external position and said standby position;

UNITED STATES PATENT AND TRADEMARK OFFICE
CERTIFICATE OF CORRECTION

PATENT NO. : 5,970,036
DATED : October 19, 1999
INVENTOR(S) : Hiroshi MATSUGASE

It is certified that error appears in the above-identified patent and that said Letters Patent is hereby corrected as shown below:

a sub tray engaging member provided in said base tray and elastically deformable so as to generate an urging force;

a hook formed on each of said sub trays and being engageable with said sub tray engaging member under said urging force, while each of said sub trays is disengageable from said sub tray engaging member against said urging force when said sub tray is located at said standby position and said playback position; and a sub tray selecting mechanism provided in said casing and rotatable so as to adjust a selecting position in accordance with the height of a designated one of said sub trays, said sub tray selecting mechanism being capable of retaining said designated sub tray and any other sub trays stacked thereon and disengaging each of the retained sub trays from said sub tray engaging member in accordance with a shifting motion of said base tray advancing to the external position, thereby making said retained sub trays stay at the standby position.

UNITED STATES PATENT AND TRADEMARK OFFICE
CERTIFICATE OF CORRECTION

PATENT NO. : 5,970,036
DATED : October 19, 1999
INVENTOR(S) : Hiroshi MATSUGASE

It is certified that error appears in the above-identified patent and that said Letters Patent is hereby corrected as shown below:

Column 13, Claim 12, line 1, after "comprising" insert -- : --.

Signed and Sealed this

Twentieth Day of June, 2000

Attest:

Q. TODD DICKINSON

*Attesting Officer*       *Director of Patents and Trademarks*